United States Patent [19]

Prucher

[11] Patent Number: 5,041,711
[45] Date of Patent: Aug. 20, 1991

[54] SPOT WELDING ELECTRODE

[75] Inventor: Bryan P. Prucher, Clarkston, Mich.

[73] Assignee: Hobie Holding, Inc., Clarkston, Mich.

[21] Appl. No.: 784,206

[22] Filed: Oct. 4, 1985

[51] Int. Cl.$^5$ .............................................. B23K 9/28
[52] U.S. Cl. ................................. 219/119; 219/86.1
[58] Field of Search ..................... 219/119, 120, 86.1; 165/47, 104.26

[56] References Cited

U.S. PATENT DOCUMENTS

| 3,664,412 | 5/1972 | Zerkle | 165/104.26 |
| 3,889,096 | 6/1975 | Asselman et al. | 165/104.26 |
| 4,476,372 | 10/1984 | Prucher | 219/119 |

FOREIGN PATENT DOCUMENTS 2305529  2/1973  Fed. Rep. of Germany ...... 219/120

Primary Examiner—Leo P. Picard
Assistant Examiner—Lincoln Donovan
Attorney, Agent, or Firm—Weintraub, DuRoss & Brady

[57] ABSTRACT

A spot welding electrode includes a plurality of alternating, co-axially first and second sections, the first sections having a first predetermined sized cross section. Each first section has an undercut portion tangential to the second section which defines a shear line. The second sections have a second predetermined sized cross section smaller than the cross section of the first sections. The outer sides of the second sections form undercut areas between the outer sides of adjacent first sections. The outer sides of the second sections act as cleavage surfaces which remove excess material formed at the peripheral edges of the adjoining first sections caused by successive deformation of the first sections during repeated welding operations.

12 Claims, 2 Drawing Sheets

SPOT WELDING ELECTRODE

BACKGROUND OF THE INVENTION

1. Field of the Invention:

This invention relates, in general, to resistance spot welding equipment and, more specifically, to resistance spot welding electrodes.

2. Description of the Prior Art:

Resistance spot welding is a process commonly used to join two thin metal sheets together. A spot weld is produced by clamping the two thin sheets of metal together under high pressure or force between two axially aligned electrodes and passing a high electrical current between the electrodes through the metal sheets. The high resistance at the interface of the two metal sheets causes heating of the sheets in an area between the contact surfaces of the electrodes. This rapid heating creates a molten zone of metal which, when cooled, forms a solid weld spot or nugget fusing the two metal sheets together.

The electrodes used to form a spot weld are typically constructed of a high electrically conductive material, such as copper. The size and shape of the electrode determines the size and shape of the spot weld. The electrodes may have an integral single piece form or may be constructed of a holder or shank portion which receives a replaceable cap or tip at one end. The interior of the electrode is hollow and is provided with coolant flow paths for removing heat generated by the high currents passing through the electrode.

The diameter of the electrode or tip, which is generally circular in form, is a critical parameter in producing spot welds of sufficient size to hold two metal sheets together. Thus, depending on the thickness of the two sheets, the electrode pressure, the welding current, etc., the diameter of the electrode is selected to produce a particular diameter weld spot sufficient to hold the two sheets together.

During repeated spot welding operations, the electrodes experience considerable deformation or wear at their contact surfaces due to the high clamping pressures and the heat generated by the current passing through each electrode. Such wear or deformation causes the contact surface of the electrode to spread out or "mushroom" which increases its diameter. The increased diameter of the electrode has adverse effects on the spot weld to be produced since less heat is generated at the metal sheet interface due to current flow through the larger contact area of the two electrodes. Thus, frequent reshaping or dressing of the electrode tip is required to return the tip to its orignal size and shape. This necessitates interruption of the welding operation which lowers production and increases labor costs since hand machining by a file is typically employed to reshape the electrode tip.

Thus, it would be desirable to provide a spot welding electrode which overcomes the problems of previously devised spot welding electrodes which require frequent reshaping or redressing. It would also be desirable to provide a spot welding electrode which substantially eliminates the need for reshaping or redressing during repeated spot welding operations.

In U.S. Pat. No. 4,476,372, the disclosure of which is hereby incorporated by reference, there is disclosed and claimed an improved electrode of the type under consideration herein, wherein the electrode tip has a plurality of concentric enlarged sections adjacent reduced sections, the outer sides of which act as cleavage surfaces for removing excess material caused by successive deformation of the enlarged sections. While the electrode is eminently useful it has been found that certain improvements therein will extend the usefulness thereof by providing for better cleavage of the outer surfaces of the enlarged sections.

SUMMARY OF THE INVENTION

A spot welding electrode is disclosed which includes a plurality of alternating, co-axially aligned, integrally formed first and second sections. The first sections have a first predetermined sized cross section. The second sections have a second predetermined sized cross section which is smaller than the cross section of the first sections. The outer sides of the second sections form undercut areas between the outer sides of adjacent first sections. The outer sides of the second sections act as cleavage surfaces which remove excess material formed on the peripheral edges of successive first sections which is caused by deformation of the first sections during repeated spot welding operations.

The present electrode further includes an undercut portion in the first sections circumferentially formed at the intersection of adjacent first and second sections and which is tangential to the second sections. The undercut portions are vertically, axially aligned to define a shear line to enhance cleavage.

The spot welding electrode of the present invention overcomes many of the problems facing previously devised spot welding electrodes which require time consuming and costly reshaping or redressing to return the electrode tips to their original shape and size from the deformation caused by repeated spot welding operations. The undercut areas on the electrode, in cooperation with the undercut portions, remove excess material from the peripheral edges of the adjacent first sections which, thereby, automatically and consistently reshapes and redresses the electrode tip during welding operations. This eliminates stoppage of the welding operations which increases production and eliminates the time consuming and costly labor which has been previously required to hand machine the deformed electrode to its original shape and size.

The present invention, also, provides an improved closed-loop coolant fluid flow path wherein a capillary material is used to transfer the cooling or coolant fluid from the base of the electrode holder to the top or tip thereof to provide the necessary cooling to the electrode.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
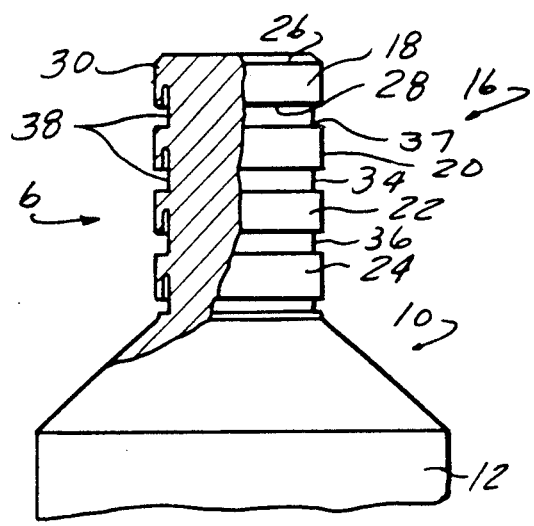
FIG. 1 is an enlarged elevational view of the spot welding electrode of the present invention.

Throughout the following description and drawing, an identical reference number is used to refer to the same component shown in multiple figures of the drawing.

As is conventional, in spot welding operations, a pair of axially aligned electrodes are brought together under high force or pressure on opposite sides of two thin sheets of metal. An electric current is passed between the electrodes through the sheets. The high resistance at the interface of the two metallic sheets between the electrodes causes rapid heating which creates a molten zone in the metal sheets in the area between the contact surface areas of the electrodes. The molten zone, when cooled, forms a weld spot or nugget which fuses the two sheets together. The term electrode as used in the present invention describes that portion of a spot welding apparatus which contacts the metal sheets under high force and directs current flow through the clamped sheets in an area corresponding to the surface area of the contact surface of the electrode. The electrode may be formed as an integral single piece assembly having an elongated shank, with the end or tip of the shaft being formed as the contact surface of the electrode.

Alternately, as shown by way of example in FIG. 1 and the following description, the electrode 6 includes an elongated hollow shaft or holder, not shown, which receives a replaceable cap 10.

The electrode 6 is formed of a high electrically conductive material, such as copper. Additional elements or materials, such as chromium, may also be added to the copper for strength, enhanced thermal conductivity, etc.

As shown in FIG. 1, the cap portion 10 of the electrode 6 of the present invention includes an end or mounting portion 12. The end portion 12 has, by way of example only, a circular cross section. A hollow cavity is formed within the interior of the end portion 12 and extends from one end inward within the portion 12. The hollow cavity provides a flow path for coolant fluid within the interior of the cap 10 for removing heat therefrom which is generated by the high electrical current passing through the electrode 6 during the spot welding operation.

The cap 10 also includes a tip portion 16 which is integrally formed at one end of the end portion 12. The tip portion 16 includes a plurality of alternating, co-axially aligned, first and second sections. By way of example; the tip portion 16 includes four identical first sections 18, 20, 22 and 24. Each of the first sections 18, 20, 22 and 24 has a first predetermined-sized cross section. Preferably, each of the first sections 18, 20, 22 and 24 has a circular cross section. The diameter of each of the first sections 18, 20, 22 and 24 may be formed in any size so as to adapt the electrode 6 to the particular size weld spot that must be formed to bind two sheets of metal together. As is conventional, the diameter or surface contact area of an electrode is selected depending upon the thickness of the metal sheets to be welded, the welding current, the edge spacing, contact pressure, etc.

Each of the first sections 18, 20, 22 and 24 is provided with top and bottom surfaces, such as top and bottom surfaces 26 and 28, respectively, for the first section 18. A perpendicular side 30 extends between the top and bottom surfaces 26 and 28 of each of the first sections.

Although four first sections 18, 20, 22 and 24 are illustrated as being formed on the electrode 6, it is to be understood, however, that any number of first sections may be employed in constructing the electrode 6 of the present invention.

A plurality of second sections 32, 34 and 36 are each interposed between adjacent first sections 18, 20, 22 and 24. Each of the second sections 32, 34 and 36 has a second predetermined-sized cross section which is smaller than the cross section of each of the first sections 18, 20, 22 and 24. The smaller diameter of cross section of each of the second sections forms an undercut or recessed area 37 between the top and bottom surfaces of adjacent first sections and the outer side walls 38 of each of the second sections, as shown in greater detail in FIG. 2.

The alternating first and second sections on the electrode 6 are integrally formed by any conventional forming operation. Thus, the reduced diameter second sections may be performed by conventional machining operations. Preferably, however, the second sections are formed by roll forming, which creates a work hardened area on the side surfaces 38 of each of the second sections 32, 34 and 36. These hardened sections provide enhanced resistance to deformation. More importantly, the outer side surfaces 38 of each of the second or undercut areas 32, 34 and 36 function as cleavage or cutting surfaces in the electrode 6. The cleavage or cutting surfaces are operative to cut away or remove excess peripheral material, such as that shown in phantom in FIG. 2, from the peripheral edges of the adjacent uppermost first section. As previously described, this excess peripheral material results from a deformation of the contact surface of the uppermost first section on the electrode 6 during repeated welding operations and must be removed in order to return the contact surface of the electrode 6 to its original size and shape for quality weld production.

Figure 2:
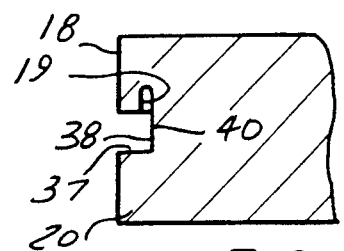
FIG. 2 is a partial, enlarged view of a portion of the electrode depicted in FIG. 1.

As more clearly shown in FIG. 2, each of the first sections 18, 20, 22 and 24 is provided with an undercut portion 19 formed in the bottom surface 28 tangential to the outer surface 38 of the second sections 32, 34 and 36. The undercut portions 19 are circumferentially formed about the entire circumference of the associated first section.

The undercut portions 19 are vertically, axially aligned and define a shear line to provide better cleavage.

In operation, the upper surface 26 of the uppermost first section 18 of the electrode 6 will form the initial contact surface for the electrode 6. During repeated welding operations in which the electrode 6 is brought into forced engagement with one side of a pair of thin metal sheets, deformation or wear of the first section 18 will occur and the first section 18 will deform in shape. In this manner, the surface area of the first uppermost section 18 will increase which adversely affects the quality of the weld that is being produced. This excess material, as denoted by reference number 40 in FIG. 2, is trimmed or cut away from the first section 18 by the cleavage surface 38 on the adjacent second section 32, in cooperation with the undercut portion 19, under the pressure or force with which the electrodes are brought together during the spot welding operation. In this manner, after the excess peripheral material 40 has been removed from the first section 18, the surface contact area of the first section 18 is automatically reshaped to the cross section of the second section 32 which is only a slight amount smaller than its original size.

During repeated spot welding operations, the uppermost first section 18 will eventually wear away from the electrode 6 as the excess material 40 is repeatedly removed from the outer peripheral edges thereof by the adjacent second section 32. The second section 32 will then function as the contact surface for the electrode 6. However, due to the relatively small thickness of the second section 32 compared to the first section, the second section 32 will wear away after a relatively small number of welding operations such that the adjacent first section 20 will form the contact surface for electrode 6. Excess peripheral material formed on the first section 20 during repeated welding operations will be removed by the adjoining second section 34, cooperating with the undercut portion 19.

As disclosed and shown in the above-referenced patent, if a longer length and additional first and second sections are desired for the electrode 6, an insert may be disposed within and integrally formed with the electrode 6 to provide additional longitudinal structural rigidity.

As disclosed in the patent, the insert has a honeycomb construction with a hollow, multisectional tubular member to which are joined radially extending fins, preferably, formed of a refractory material such as a silver-tungsten alloy.

Ordinarily, the insert and the electrode are integrally fabricated using powered metallurgical techniques. With this conventional manufacturing process, the insert is positioned in the electrode die or molding cavity prior to the insertion of the electro-alloy metal powder. The power is then compressed in the die encapsulating the insert within the electrode 6 to form an integral assembly. During the sintering process, the lower melting point alloying agent in the insert, which is silver in the silver-tungsten alloy used in the preferred embodiment of this invention, combines with the encapsulating copper alloy to form an integral fused assembly.

The insert may have other configurations, such as a star configuration in which a plurality of outwardly extending fins or ribs are integrally joined at an inner end. Also, a modified honeycomb configuration may be employed, which includes an inner, multi-section, hollow tubular member to which are joined elongated ribs which have a longer length than the tubular insert and extend radially outward therefrom.

The insert provides the necessary structural longitudinal rigidity to the electrode 6 which has a large number of first and second sections. Mechanical forces which are exerted on the electrode 6 during successive welding operations causes the upper end of the insert, as well as the first and second sections of the electrode to deform, which deformed material will be removed from the electrode 6 by the recessed, undercut sections of the second sections and the undercut portions formed in the electrode 6, as described above.

Figure 6:
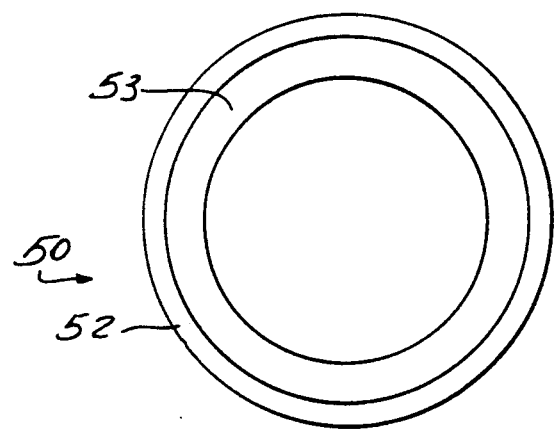
FIG. 6 is a bottom plan view of the coolant transfer assembly of FIG. 5.
Figure 8:
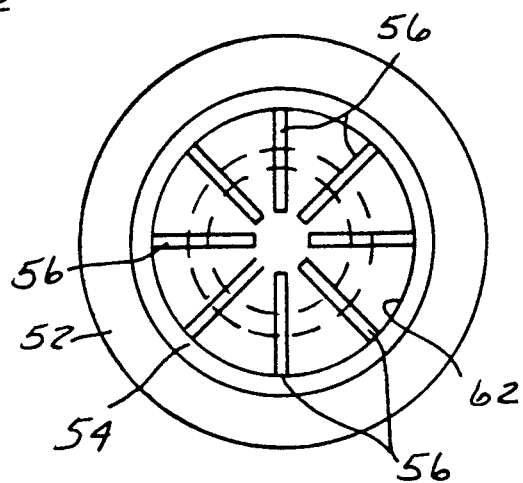
FIG. 8 is a bottom view of the spot welding electrode shown in FIG. 7.
Figure 7:
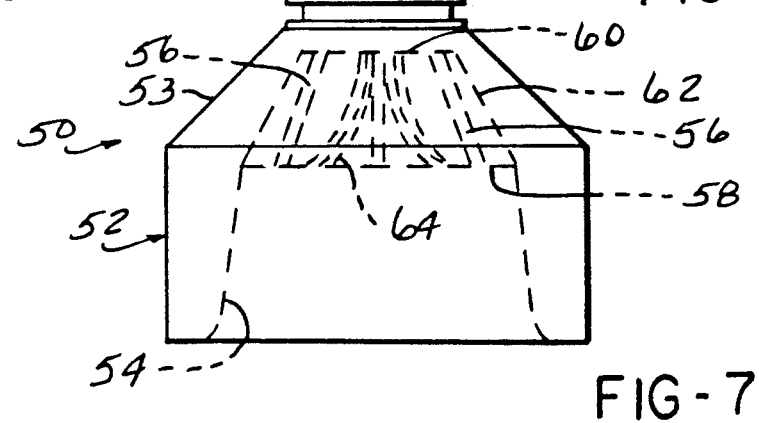
FIG. 7 is a partial, enlarged elevational view of another embodiment of the spot welding electrode of the present invention.

As shown in FIGS. 6 and 7, there is depicted another embodiment of the end or top portion of the electrode of the present invention. As shown in FIGS. 7 and 8, the end portion 50 has the same outer configuration as the end portion 12 of the electrode 6 shown in FIG. 1 and includes a straight sidewall portion 52 and a tapering upper portion 53. An internal recess or cavity 54 is formed within the end portion 50 and extends from a first end inward to substantially the upper end of the end portion 50 adjacent to the bottom end of the tip portion 16.

A plurality of circumferentially spaced fins 56 are formed on the upper portion of the internal cavity 54. The fins 56 comprise thin rib-like members which extend between an intermediate point 58 in the internal cavity 54 and an upper point 60 of the cavity 54. The fins 56 extend from the sidewalls 62 of the upper portion of the cavity 54 inward a predetermined distance to the center of the cavity 54. The inner face 64 of each fin has an arcuate shaped surface for efficient coolant fluid flow characteristics.

The fins 56 function to increase the surface area of the cap portion 50 which is disposed in contact with the coolant fluid within the interior of the electrode. In this manner, increased amounts of heat from the cap 50 which prevents its degeneration and increases its useful life.

Figure 4:
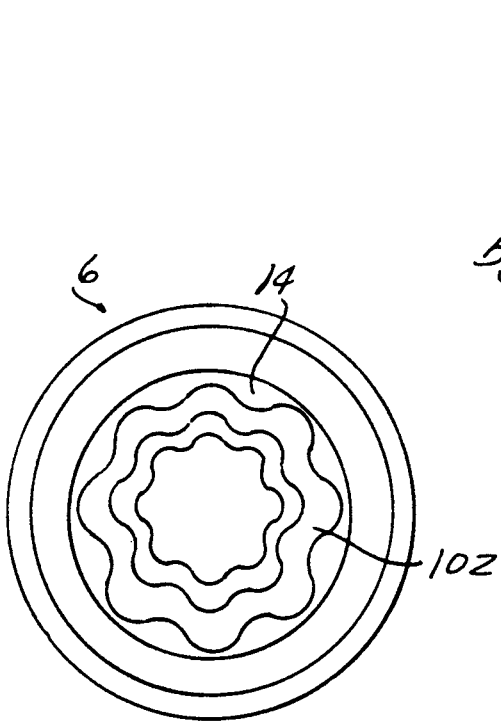
FIG. 4 is a bottom view of the coolant transfer assembly of FIG. 3.
Figures 3, 5:
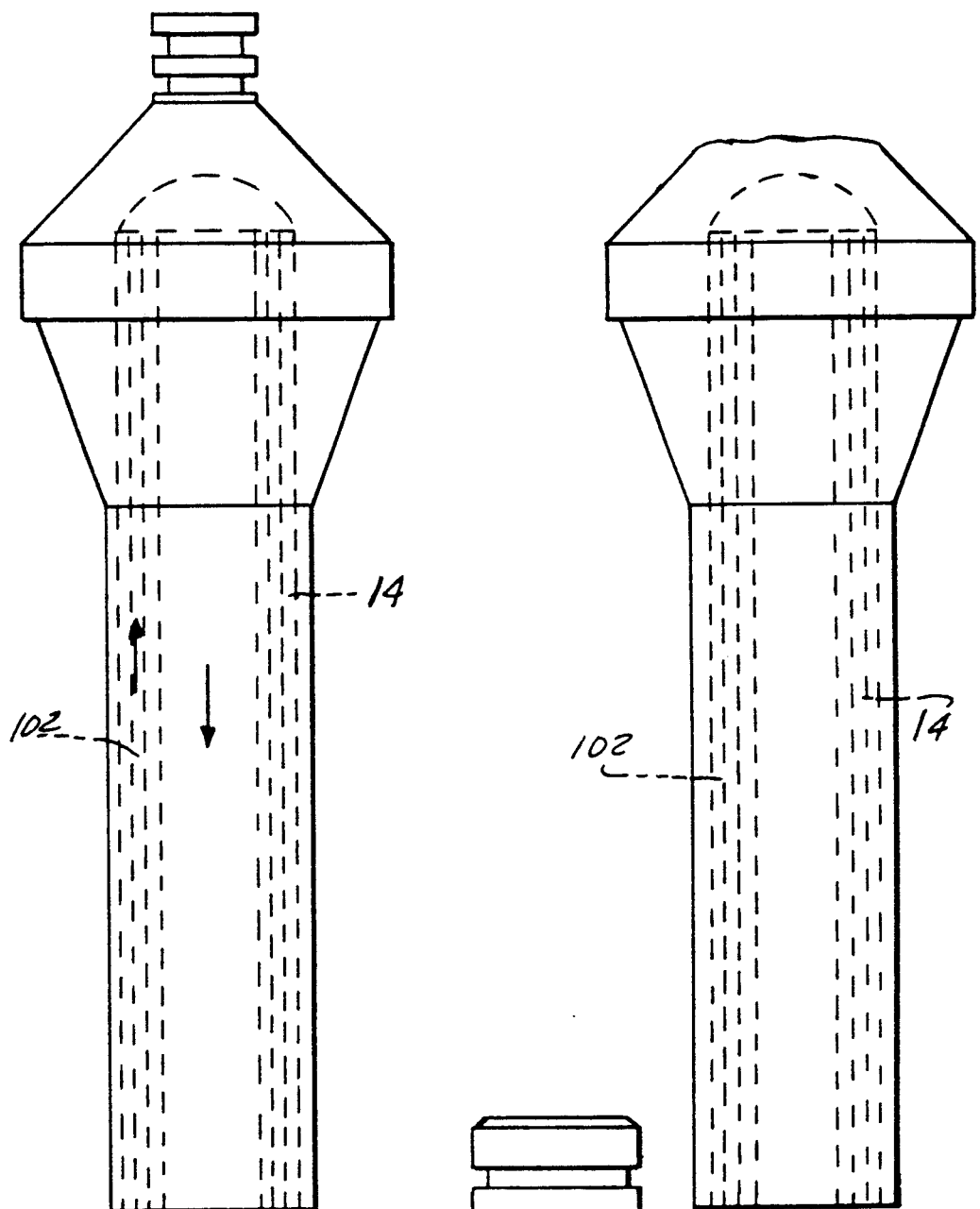
FIG. 3 is a perspective view of a coolant transfer assembly for use in the present invention.
FIG. 5 is a side elevational view of an alternate embodiment of the coolant transfer assembly.

As shown in FIGS. 3 and 4, and in order to enhance the cooling of the electrode 6 a closed-loop coolant transfer assembly 100 is formed within the interior thereof.

The coolant transfer assembly, generally, comprises a capillary material 102 which is mounted within the interior of the electrode and extends into the hollow cavity 14. The capillary material is formed of any suitable material and draws a suitable coolant, such as a long chain fluocarbon which can have a tailored heat of evaporation and condensation, up into the cavity 14 where, by general heat transfer principles, it is vaporized and returned to the base of the holder 8 whereat it condenses and is, then, redrawn up the capillary material. It should be noted that the closed-looped system is a primary coolant system which is amenable to having a secondary coolant assembly employed to cool both the exterior of the electrode as well as the capillary material or exterior surface of the closed-looped system.

The capillary material employed herein is a porous which can withstand the thermal operating environment hereof and still function as a wick.

Suitable capillary materials include stainless steel and fibrous meshes, such as, asbestos. These materials are well-known and commercially available.

Alternatively, by using powder metallurgy techniques the interior wall of the holder 8 can be formed as a porous wall formed of copper and the like. The porosity of the surface will function similar to that of the mesh to give the necessary "wicking" effect.

The capillary material is conformed to the configuration of the interior of the electrode. For example, and as shown in FIGS. 3 and 4, where the interior is finned or convoluted the capillary material is fitted about the convolutions. The structural strength of the capillary material retains its shape.

As shown in FIGS. 5 and 6, wherein the holder 8 is cylindrical within the interior, the capillary material 102 is circumferentially mounted therewithin or formed directly as part of the wall.

Likewise, it should be noted, that the electrode can be formed as an integral unit without a separate holder and cap.

Furthermore, the deployment of the capillary material as a means for transferring coolant can be incorporated into conventional electrodes.

In summary, a spot welding electrode has been disclosed which overcomes many of the problems associated with previously devised welding electrodes which require frequent, time consuming and costly manual machining operations to remove excess peripheral material formed on the electrode during repeated welding operations. In the electrode of the present invention, such excess material is automatically and continually removed from the contact surface of the electrode thereby eliminating such reshaping labor and frequent stopage of the welding operation.

I claim:

1. In a spot welding electrode of the type comprising:
   a plurality of co-axially spaced first sections, each having a first predetermined sized cross section;
   a plurality of second sections each integrally and co-axially formed with and interposed between adjacent first sections, each of the second sections having a second predetermined sized cross section smaller than the first cross section of the first sections; wherein
   the outer side surfaces of the second section form undercut areas between the outer side surfaces of the second sections serving as cleavage surfaces to remove excess material formed at the peripheral edges of the adjacent first section caused by deformation of successive first sections during repeated welding operations, the improvement which comprises:
   each first section having an axially, vertically aligned undercut portion defining a groove formed therearound and in the bottom surface thereof tangential to the outer side surfaces of the second sections to define a shear line.

2. The improvement of claim 1 further including a cap having an end portion and a tip portion, the end portion having an internal cavity for coolant fluid flow, the tip portion including the alternating co-axial first and second sections.

3. The improvement of claim 2 wherein the cap is removably emplaceable on an electrode holder having an internal bore which communicates with the internal cavity in the end portion of the cap for coolant fluid flow.

4. The improvement of claim 2 which further comprises:
   a capillary material disposed within the internal cavity for transferring coolant to the tip portion.

5. The improvement of claim 4 wherein:
   the capillary material is a process surface formed in the wall of the cavity.

6. The improvement of claim 4 wherein:
   the capillary material is an insert disposed within the cavity.

7. The improvement of claim 6 wherein:
   the capillary material is a porous material which defines a wick.

8. The improvement of claim 7 wherein the capillary material is a fibrous mesh.

9. The improvement of claim 7 wherein the capillary material is a stainless steel mesh.

10. The improvement of claim 7 wherein the capillary material is a porous copper surface formed on the interior surface of the holder.

11. The improvement of claim 1 wherein the first and second sections have circular cross sections.

12. A spot welding electrode cap removably emplaceable on a hollow holder comprising:
    alternating, co-axially aligned first and second sections, the first sections having a first predetermined sized cross section, the second sections having a second predetermined sized cross section smaller than the cross section of the first sections;
    the outer surfaces of the second sections forming undercut areas between the outer surfaces of adjacent first sections, the outer surfaces of the second sections functioning as cleavage surfaces which remove excess material formed on the peripheral edges of adjacent first sections during repeated welding operations;
    each first section having an axially, vertically aligned undercut portion defining a groove formed therearound and in the bottom surface thereof tangential to the outer surfaces of the second sections to define a shear line; and
    an end portion having the first and second sections formed at one end, the end portion having an internal cavity for coolant fluid flow.

* * * * *